Nov. 15, 1932.                W. F. HEROLD                1,888,036
                                 CASTER
                           Filed Jan. 24, 1927
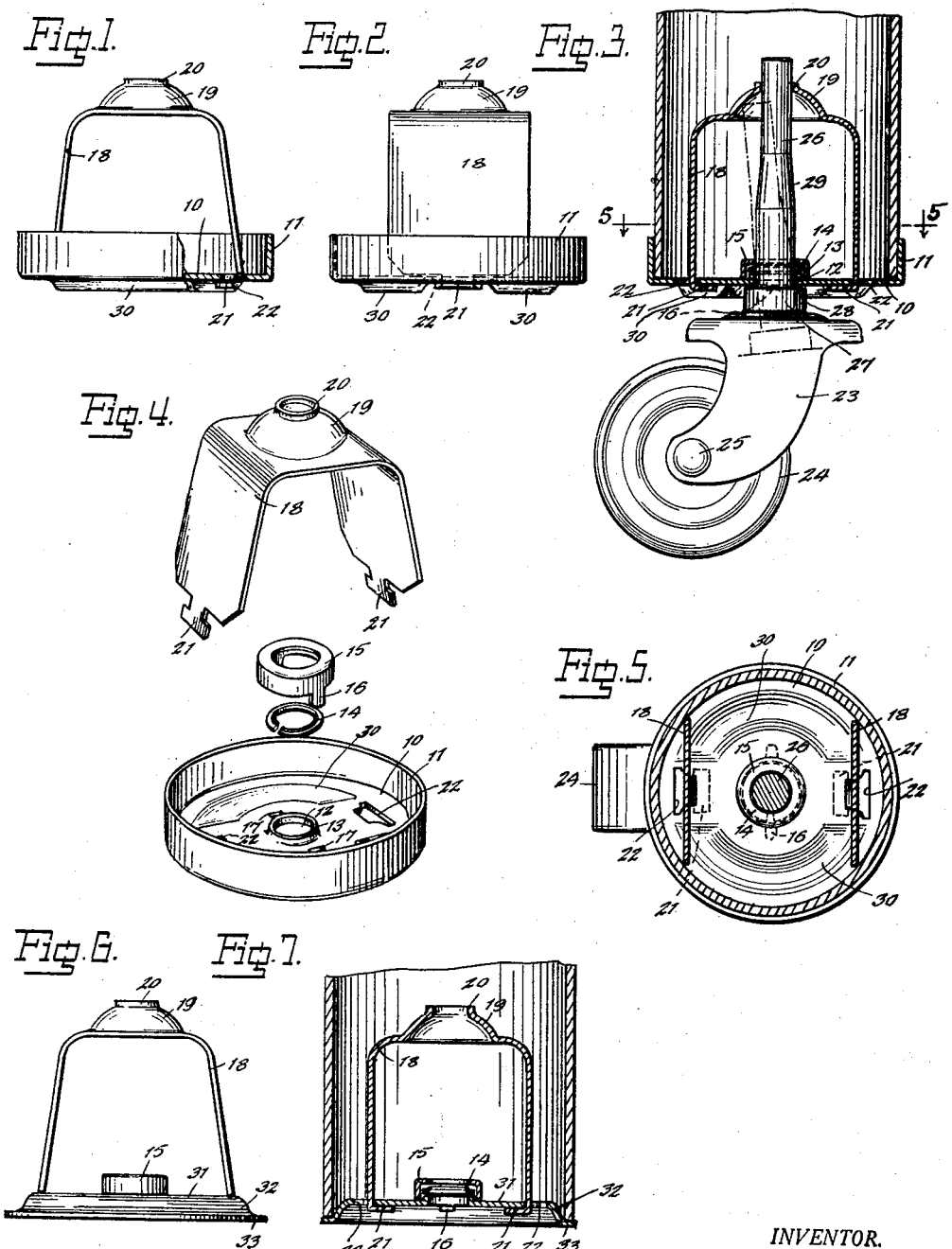
INVENTOR.
WALTER F. HEROLD.
BY
ATTORNEY.

Patented Nov. 15, 1932

1,888,036

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed January 24, 1927. Serial No. 163,249.

The present invention relates to improvements in casters, particularly of the type adapted for use with hollow metal posts of bed-steads, or the like, and in which a caster retaining spring frame and leg mount structure is provided. Heretofore this type of caster has consisted of a spring frame adapted for insertion in the furniture leg, a leg mount base engaged with the bottom of the leg, and a caster having its pintle extended through an aperture in the base and connected at its upper end to the spring frame, usually by a structure which prevented removal of the caster from the spring frame.

It is proposed, in the present invention, to provide a spring frame member including a leg mount or base member connected thereto, and a removable caster adapted to be readily removed from the spring frame unit when desired, and further to provide a base member which may function as a supporting slide upon removal of the caster.

An object of the invention is to provide an improved spring frame and leg mount unit having pintle retaining means provided in the leg mount adapted to reliably hold the caster against dropping out, while at the same time permitting unimpeded swiveling action, and further, which permits of the caster being easily removed and inserted. It is also proposed to provide an improved bottom bearing for the pintle, providing both a thrust bearing and a relatively long journal bearing.

Another object is to provide an improved spring frame construction including a top and spring side leg portions, and in particular, to provide a top portion for receiving the upper end of the pintle, and which provides positive guide means adapted to center the pintle and prevent any possibility of jamming or distortion, in the event that it is inserted at an angle to its normal vertical position. The top portion, furthermore, will be so reinforced as to be inherently rigid.

A further object is to provide an improved interlocking connection between the spring frame and leg mount members, which prevents any possibility of their being deranged or separated, which may be conveniently assembled without first compressing the spring frame, and with which an increased holding effect is provided upon compression of the spring frame in its inserted relation in the furniture leg.

With the above and other objects in view, embodiments of the invention, are shown in the accompanying drawing, and these embodiments will be hereinafter more fully described with reference thereto, and the invention will be finally pointed out in the claims.

In the drawing:—

Fig. 1 is a side elevation, partly in section, of the spring frame and leg mount unit, according to the present embodiment of the invention;

Fig. 2 is a front elevation thereof;

Fig. 3 is a vertical sectional view of the same, inserted in the furniture leg, and with the caster in place therein;

Fig. 4 is a perspective view, showing the several parts of the spring frame and leg mount unit in separated relation;

Fig. 5 is a horizontal sectional view, taken along the lines 5—5 of Fig. 3;

Fig. 6 is a side elevation of a spring frame and leg mount unit, according to a modification of the invention; and Fig. 7 is a vertical sectional view thereof, inserted in a furniture leg.

Similar reference characters indicate corresponding parts throughout the several figures of the drawing.

Referring to the drawing, the caster, according to the present embodiment of the invention, comprises a spring frame and leg mount unit adapted for insertion in a tubular furniture leg, and a pintle caster unit adapted for insertion and removal with respect to the spring frame and leg mount unit. The spring frame and leg mount unit consists of a circular base plate 10 having a peripheral upwardly bent flange 11 and provided with a central pintle receiving aperture 12, flanged upwardly, as at 13, to provide a combination thrust and journal bearing for the pintle, as will hereinafter more fully appear. A pintle retaining split spring ring 14, preferably of the type disclosed in my co-pending application, Serial Number 120,670, filed July 6, 1926, is mounted at the upper edge of the flange 13, and is retained in a centrally apertured cup member 15, secured to the base plate by means of lugs 16, 16, engaged through diametrically opposed slots 17, 17, in the plate and bent over upon the under surface, the aperture of the cup member being of the same diameter as the aperture 12 of the base plate, and with it constituting a relatively long journal bearing for the pintle, which in addition to its better bearing surface is of greatly increased strength. The diameter of the ring is such that its inner edge normally projects within the pintle bearing opening and is adapted to frictionally grip upon the surface of the pintle to yieldably retain it, being freely rotatable within the cup member during swiveling action of the caster.

The spring frame member 18, of inverted U-shape, is formed from flat sheet metal, and is provided in its upper transverse portion with a dome-shaped pintle guide portion 19, pressed upwardly therein, and provided with a central flanged aperture 20, which in the connected relation of the frame to the leg mount base is aligned with the central aperture of said base and is adapted to be engaged by the upper end of the caster pintle. The portion 19, in addition to providing a pintle guide surface, reinforces the top of the frame, so that it is inherently rigid.

At the lower edges of each of the side legs of the spring frame there are respectively provided downwardly projecting locking extensions 21 of inverted T-shape and adapted to be interlockingly engaged in diametrically opposite openings 22 provided in the base plate. These openings are of special shape, being relatively wide at their outer edges to receive the wide ends of the extensions 21, and converging at their side edges to a relatively narrow inner portion of a width adapted to receive the narrow neck portions of said extensions, the depth of the openings corresponding to the expansion and compression movements of the side legs. In assembling the frame to the leg mount base the extensions 21, as shown in Fig. 4, are inserted in the openings 22 at their relatively wide outer portions, the side legs being in their expanded or normal relation, and said extensions are thereupon bent inwardly, as shown in Fig. 1, upon the under surface of the leg mount base, so that in the expanded relation of the side legs the enlarged portions of the extensions are disposed laterally beneath the narrow inner ends of said openings 22, and thus a positive interlocked relation is effected, and free compression and expansion movement of the side legs is permitted. In the disengaged relation of the spring frame and the leg mount unit, the side legs are divergent, and are limited in their expansion by abutment against the outer edges of the opening 22. In the inserted position in the furniture leg, as shown in Figs. 3 and 5, the side legs are vertically disposed, so that their vertical edges have frictional holding contact with the furniture leg along their entire length. The extensions 21 in this relation have their wide end portions disposed beneath the solid structure of the base, while the neck portions are engaged in the narrow inner ends of the openings 22, and a double locking action results from engagement of the bent over ends upon the under surface of the base and from the notched structure of the extensions interlockingly engaged in the narrow portions of the openings, this interlocking engagement preventing relative rotary movement of the base plate. This provides resistance against very considerable strain upon the frame, due to the offset of the caster wheel and the consequent side thrust at the upper end of the pintle, and in fact will take care of strain greatly in excess of the normal load, and such as might result from dropping the furniture, or forcibly moving the caster wheel against an obstruction.

The caster wheel unit consists of the usual horn 23 having a wheel 24 carried therein upon an axle 25 and having a pintle 26 secured in its upper transverse portion. The pintle is provided at its base, adjacent the horn, with a flange 27 having a filleted shoulder 28 at its upper edge, which provides a combination thrust and journal bearing having contact with the turned edge of the flange 13. The pintle is furthermore tapered intermediate its ends, as at 29, so that its upper end is of reduced diameter to facilitate insertion through the retaining ring 14, which in its normal contracted relation is of larger diameter than said reduced diameter pintle portion. The lower portion of the pintle, however, expands the ring, so that the latter is gripped thereon, and during swiveling of the caster rotates therewith in loose relation within the cup member 15.

The clearance of the bearing apertures 12 and 16, with respect to the pintle is such that the latter may be inserted at an angle to its normal vertical position. In any case, however, its upper end engages and is confined in the domed guide portion 19, and is guided thereby into the central apertures 20, as shown in dotted lines in Fig. 3.

In order that the spring frame and leg mount unit may function as a slide, when the caster unit is removed, the leg mount base plate is provided with arcuate bosses 30 pressed downwardly therein at each side of the central aperture 12 and the openings 22, their lower or floor engaging surfaces being below the plane of the spring frame ends 21, and the lugs 16 of the cup member 15, so that smooth sliding contact is provided with the floor.

In Figs. 6 and 7 I have illustrated a modification, in which a different type of base plate is provided. This plate 31 is provided at its periphery with a downwardly bent flange portion 32 and an outwardly bent rim 33, the latter adapted to abut and engage beneath the end of the furniture leg, and which further constitutes a slide surface for engagement with the floor when the caster is removed.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. A furniture leg engaging unit for casters comprising a centrally apertured base plate having diametrically opposed openings disposed between said aperture and the periphery, said openings being relatively narrow at their inner ends and relatively wide at their outer ends and a spring frame member having side leg portions adapted to be compressed and expanded, and extensions at the lower ends of said side leg portions laterally movable with respect to said base member adapted in the expanded position of said side leg portions to be inserted in said openings and bent beneath said base plate into angular relation with said side leg portions, and in their compressed positions to be interlockingly connected to said base member to prevent relative rotary movement of said base member, said openings limiting the expanded position, said spring frame member adapted to be inserted and retained in the furniture leg in its compressed relation, whereby relative rotary movement of said base plate is prevented.

2. A furniture leg engaging unit for casters, comprising a centrally apertured base plate having diametrically opposed openings disposed between said aperture and the periphery, said openings being relatively narrow at their inner ends and relatively wide at their outer ends, and a spring frame member having side leg portions adapted to be compressed and expanded, and extensions at the lower ends of said side leg portions laterally movable with respect to said base member having a relatively narrow portion adjacent the lower edges of said side leg portions and a relatively wide lower end portion, and adapted in the expanded position of said side leg portions to be inserted in the wide outer end portions of said openings, and in the compressed position to be engaged in said narrow inner end portions of the openings to prevent relative rotary movement of said base member, said spring frame member adapted to be inserted in the furniture leg in its compressed relation, whereby relative rotary movement of said base plate is prevented.

3. The invention as defined in claim 2, further characterized by said extensions being bent over upon the under side of said base plate in angular relation to the side leg portions.

Signed at Bridgeport, in the county of Fairfield, and State of Connecticut, this 18th day of January, 1927.

WALTER F. HEROLD.